United States Patent
Gravelle et al.

(10) Patent No.: US 10,708,745 B2
(45) Date of Patent: *Jul. 7, 2020

(54) VEHICLE TRACKING SYSTEM USING SMART-PHONE AS ACTIVE TRANSPONDER

(71) Applicant: Amtech Systems, LLC, Albuquerque, NM (US)

(72) Inventors: Kelly Gravelle, Poway, CA (US); John Todd Elson, Albuquerque, NM (US); Greg Lantz, Albuquerque, NM (US); Michael Melville, Albuquerque, NM (US); Paul Hamel, Albuquerque, NM (US); Yousuf Kamal, Albuquerque, NM (US)

(73) Assignee: Amtech Systems, LLC, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/136,884

(22) Filed: Sep. 20, 2018

(65) Prior Publication Data
US 2019/0019362 A1    Jan. 17, 2019

Related U.S. Application Data

(63) Continuation of application No. 15/597,778, filed on May 17, 2017, now Pat. No. 10,134,210.
(Continued)

(51) Int. Cl.
*G07C 9/00* (2020.01)
*H04W 4/80* (2018.01)
(Continued)

(52) U.S. Cl.
CPC ............ *H04W 4/80* (2018.02); *G07B 15/063* (2013.01); *H04W 4/44* (2018.02)

(58) Field of Classification Search
CPC ............ G07C 9/00119; G07C 9/00896; G07C 2009/00928; G06K 19/06018;
(Continued)

(56) References Cited

U.S. PATENT DOCUMENTS

| 5,310,999 | A  | * | 5/1994 | Claus ..................... | G01S 13/751 |
| | | | | | 235/384 |
| 2008/0204278 | A1 | * | 8/2008 | Tsuzuki ............... | G07B 15/063 |
| | | | | | 340/928 |

(Continued)

*Primary Examiner* — Edwin C Holloway, III
(74) *Attorney, Agent, or Firm* — Snyder, Clark, Lesch & Chung, LLP (57) ABSTRACT

A system is described for tracking vehicle position using a smart phone or similar device as an active transponder that communicates with roadside equipment. The system may uses existing RF transceivers on the smart-phone, such as Bluetooth® LE or WiFi to periodically transmit an identifying message. Road-based equipment detects and locates the smart phone. In a further aspect, the smart phone is alerted by roadside beacons and responds with identification information. Transaction processing may be performed either on the smart phone or by roadside or back office equipment. The system may be used for automated roadway tolling and monitoring and also for access control. A coded card may be scanned by the smart card to enter identification for access control.

18 Claims, 9 Drawing Sheets

Related U.S. Application Data

(60) Provisional application No. 62/337,649, filed on May 17, 2016.

(51) Int. Cl.
*G07B 15/06* (2011.01)
*G06K 19/06* (2006.01)
*H04W 4/44* (2018.01)

(58) Field of Classification Search
CPC .... G06K 19/06037; H04W 4/80; H04W 4/44; G07B 15/063; G06Q 20/3276; G06Q 20/3229; H04M 2250/14; H04M 2203/6063
USPC .................. 340/5.7, 5.71, 928; 455/411, 558
See application file for complete search history.

(56) References Cited

U.S. PATENT DOCUMENTS

| | | | |
|---|---|---|---|
| 2010/0159876 A1* | 6/2010 | Brown ................ | H04M 1/7253 455/410 |
| 2012/0280783 A1* | 11/2012 | Gerhardt ............ | G07C 9/00309 340/5.6 |
| 2013/0018705 A1* | 1/2013 | Heath .................... | G08G 1/017 705/13 |
| 2014/0046737 A1* | 2/2014 | Graves ............... | G06Q 20/0655 705/13 |
| 2017/0228732 A1* | 8/2017 | Badenhorst ........ | G06Q 20/3278 |

* cited by examiner

VEHICLE TRACKING SYSTEM USING SMART-PHONE AS ACTIVE TRANSPONDER

CROSS-REFERENCE TO RELATED APPLICATIONS

This application is a continuation of U.S. patent application Ser. No. 15/597,778 filed on May 17, 2017 and which is hereby incorporated herein by reference.

BACKGROUND

The field of electronic vehicle tracking for tolling and other purposes has seen many iterations over the years. These include the use of vehicle-based backscatter transponders detected and communicated with by roadside equipment, active transponders detected and communicated with by roadside equipment, hybrid transponders having both active and backscatter functions; and video monitoring of vehicle license plate and other placards. Cellular telephones have also been described for use in tolling systems, alone or in combination with the aforementioned types of transponders.

One problem in tolling applications that exists regardless of the technology used is determination of the roadway lane in which the vehicle is travelling. This is critical for several reasons. Firstly, because open road tolling systems frequently employ multiple transponder detection antennas and systems to cover multiple lanes of travel, it is necessary to accurately determine lane of travel so that vehicles are not recorded more than once per crossing and so that ancillary lane-based detection equipment such as light curtains, treadles and license plate cameras are coordinated with the correct lane of travel of the detected vehicle. Secondly, various tolling and roadway traffic management operations provide incentives and/or restrictions for vehicles of different types and occupancy levels, these include the ability to travel in restricted lanes, thus it is necessary to determine if a vehicle is travelling in the required or allowed lane.

Another use of vehicle-based transponder technology is providing secure access to limited access facilities. While tolling agencies may register tolling transponders based on vehicle identification data such as license plates, such a system may be impractical for issuing devices to access a facility because, for instance, the user may legitimately use different vehicles. In these cases issuing access devices to an end user may be made on a different basis than vehicle identification. The use of smart phones as transponders in to provide access to gated facilities provides opportunities to arrange access that is not limited to a single user vehicle and that uses a device the user already has and is not likely leave in an unused vehicle.

DETAILED DESCRIPTION

Those skilled in the art will recognize other detailed designs and methods that can be developed employing the teachings of the present invention. The examples provided here are illustrative and do not limit the scope of the invention, which is defined by the attached claims. The following detailed description refers to the accompanying drawings. The same reference numbers in different drawings may identify the same or similar elements.

Aspects of the present invention are directed to novel approaches to vehicle tracking and tolling using smart phones or other wireless-enabled personal devices including smart watches and tablet computers and as active transponders. A smart phone is defined here as a cellular phone that also has capability to load and run application programs (apps) and that has wireless transceivers beyond the radio used to send voice and data to a cellular network. Smart watches at present have all of these capabilities except for the ability to directly send voice and data over a cellular network, which are typically accessed via a smart phone associated with the smart watch.

In an exemplary embodiment, the system consists of vehicle-based smart phones interacting with external fixed transceivers mounted over the roadway or beside it. The phones and external transceivers are capable of two-way communications, and both transmit and receive functions can be utilized in the system.

The system may take several forms: The phone may transmit data to one or more fixed transceivers. The phone may receive data from one or more fixed transceivers. There may be two-way communication between the fixed transceiver(s) and phone. The wireless protocol used between the phone and the transceiver(s) may be Bluetooth® low energy (BLE), IEEE 802.11/WiFi, or an emergent protocol yet to be widespread. A fixed transceiver may utilize a multi-beam antenna. A fixed transceiver may utilize one or more antennas, each providing a single beam covering a single lane or geographic area.

Determination of the vehicle's lane of travel or area may be computed by: a controller in communication with the fixed transceivers, or by the smart phone or like devices including smart watches. In this case, the smart phone can transmit its lane number or area to a back office via a cellular network, WiFi, BLE, RFID, or any other wireless protocol in use in the phone.

Figure 3:
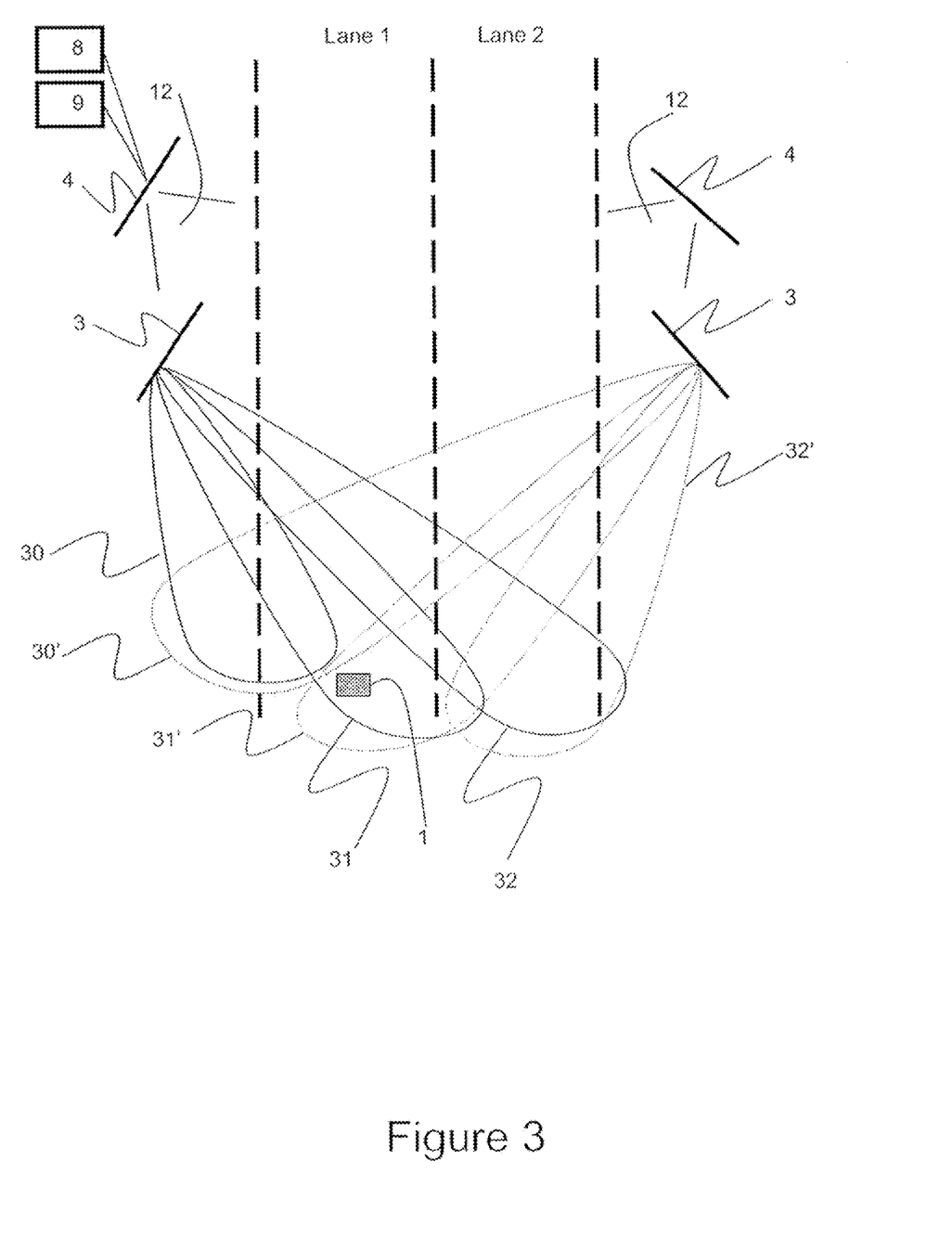
FIG. 3 is a diagram of a further exemplary system using a smart phone as a transponder.
Figure 4:
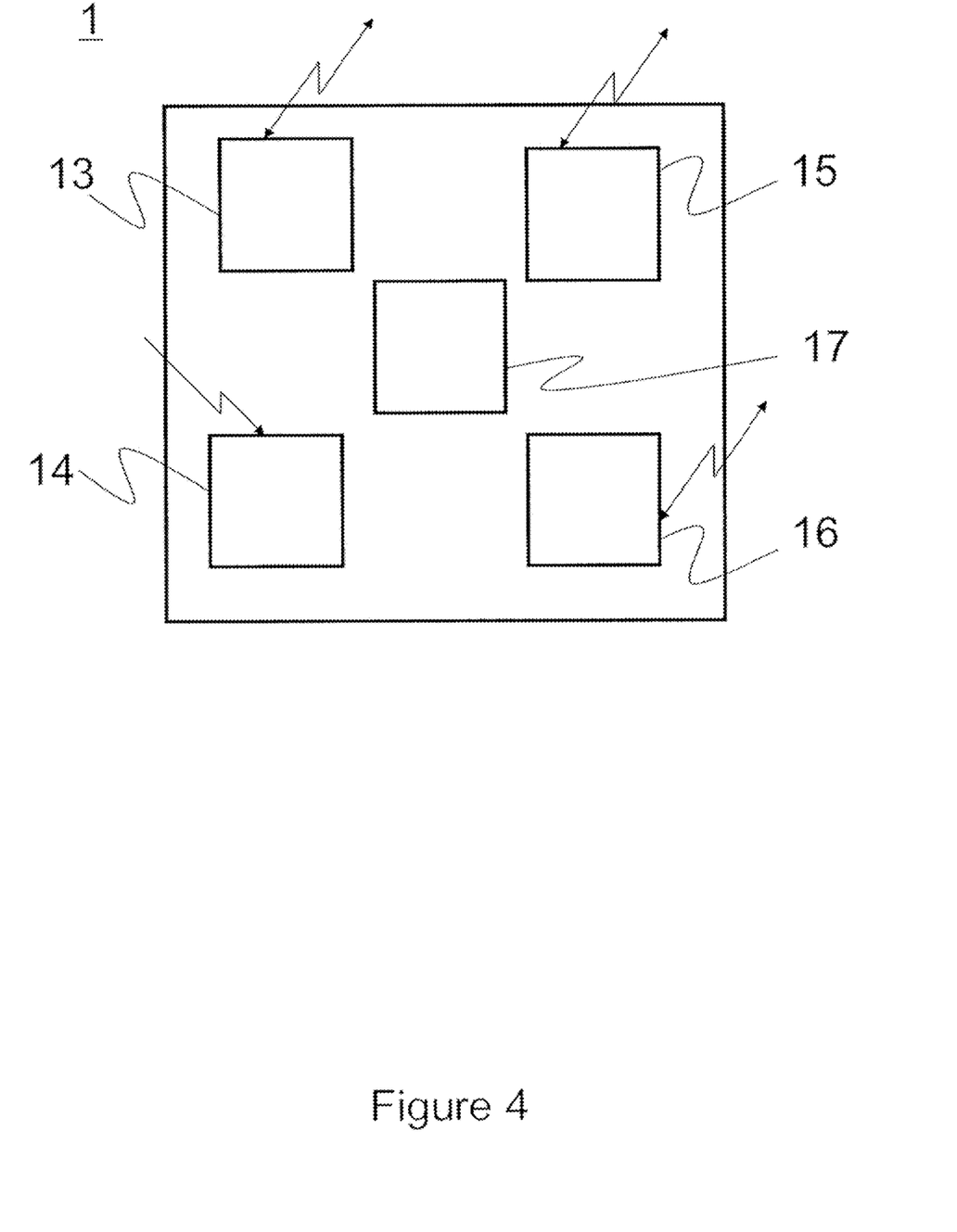
FIG. 4 is a diagram of an exemplary smart phone for use in a system using a smart phone as a transponder.

In one aspect a smart phone, shown in FIG. 4, is configured with dedicated application software to perform as an active transponder for vehicle tracking and/or roadway tolling. The smart phone is adapted to transmit a message periodically that contains a known address or identifier. An exemplary system is described with reference to FIGS. 1-4, with like numbers representing the indicated elements. An existing radio supported on the smart phone 1 such as the WiFi radio 15 or the BLE radio 13 can be used to generate these signals. The smart phone may also include a GPS receiver/processor 14, application software 17 for the phone-as-active-transponder function, and a wide area cellular network transceiver 16. Roadside and/or overhead transceivers 8, 9 detect the transmissions to identify the location of the vehicle 2. The phone 1 must be uniquely associated with data content in the message which is associated with an account used to collect the payment of tolls.

Figure 1:
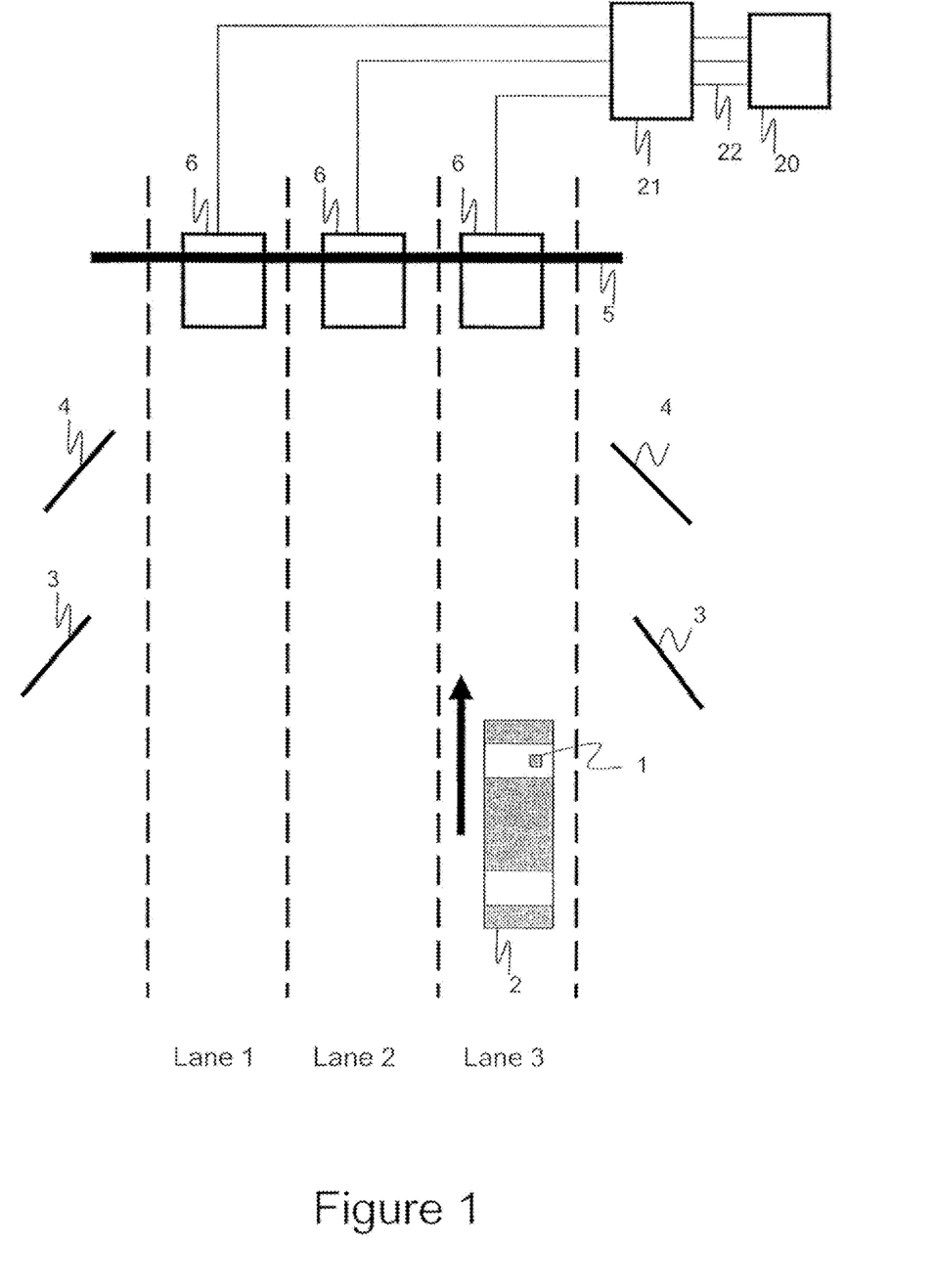
FIG. 1 is a diagram of an exemplary system using a smart phone as a transponder.

To ensure that valid uncorrupted messages from the phone are received by the roadside equipment with the vehicle moving, it is necessary that the phone 1 send messages frequently while within the toll zone. A minimum repetition rate of 10 Hz, or one per 100 milliseconds, is required, but 100 Hz or one per 10 milliseconds is preferred. Depending upon power consumption in this high rep rate mode, it may be necessary to overlay GeoZone functionality, such that the higher rep rate/power consumption mode operates only in the vicinity of toll collection zones, thus creating a low duty cycle operation to preserve cell phone battery capacity. GeoZone functionality can be implemented by comparing current GPS position (established by phone's internal GPS receiver/processor 14 to stored geo-location zones selected to include toll point locations. A current limitation on this approach is that the maximum number of GeoZones in an iPhone® is 20. Alternate methods include using BLE beacons 9 to indicate to the phone application 17 that it is in the vicinity of a toll collection point, or by using WiFi AP's 8 SSID's or MAC addresses that are detected by the phone using the phone's WiFi radio 15.

Standard radio protocols such as WiFi and BLE may be used for the transaction, and in principal any protocol with relevant hardware in the phone may be used subject to practical restrictions inherent in the protocol, hardware, and phone software. WiFi probe requests and BLE advertisements are examples of signal formats that can function as beacons in this system. The system can rely on this message alone for lane determination, or additionally utilize responses to the beacon.

To communicate with the smart phone app, fixed transceivers that utilize WiFi and/or BLE protocols are installed in the lane and connected to appropriate antennas. Messages from the phone contain a unique identifier or ID; these messages can be evaluated for received signal strength indication (RSSI). Lane position or proximate antenna position can be determined at a roadside server connected to the transceivers by Ethernet and TCP/IP or other convenient protocol. When a phone message is received at more than one transceiver across the roadway, the unique identifier, along with the RSSI, are sent to the server. Alternately, the lane determination may be made by the phone application resident and running on the phone, based on messages sent from the fixed transceivers to the phone.

The basic concept of identifying the travel lane relies on RSSI, provided by common WiFi and BLE transceivers used in mobile phones and fixed transceivers. RSSI-based algorithms for range and direction determination must be used with care owing to effects including: multipath corruption, occurring when the radio wave from a transmitter bounces off obstacles in its path and arrives at the target with relatively small time offsets from the direct path; antenna patterns with nulls in particular directions; and sensitivity to polarization.

In one approach, as shown in FIG. 1, a smart phone 1 in a vehicle 2 transmits a message via WiFi or BLE. The roadside equipment includes a gantry 5 on which are mounted one antenna 6 per lane of travel. The antennas are connected to a receiver 21 which is connected via data lines 22 to a roadside server 20. The system may also include wide-beam receiving antennas 4 and multi-beam Butler matrix antennas 3, as described further below. The server looks only at messages that meet a minimum threshold signal strength received from the smart phone 1, then compares the signal strengths received from each antenna 6 to determine the strongest one over a specified period on the order of 30 ms. As the smart phone 1 traverses the roadway, each period has a count assigned based on the strongest signal strength received on an antenna. The most proximate antenna or alternatively the lane of travel is determined to be the antenna or lane with the most counts in a larger second period (roughly 300 ms) or the total such counts during a the entire period required to traverse the section of roadway.

FIG. 3 shows an exemplary design using multi-beam antennas 3 fed by Butler matrices, creating highly directional beam patterns 30, 30', 31, 31', 32 and 32'. By determining the strongest signal path between each antenna and the phone, either received from the smart phone, it is possible to very accurately determine position of the phone and presumable the vehicle. In the example shown, the smart phone is positioned for best reception in beams 31 and 30', and it is a simple matter from there to determine that these beams intersect in Lane 1. FIG. 3 also shows wide beam pattern 12 antennas 4 connected to WiFi 8 and BLE 9 transceivers for actual data communication between the roadside equipment and the smart phone 1.

Figure 2:
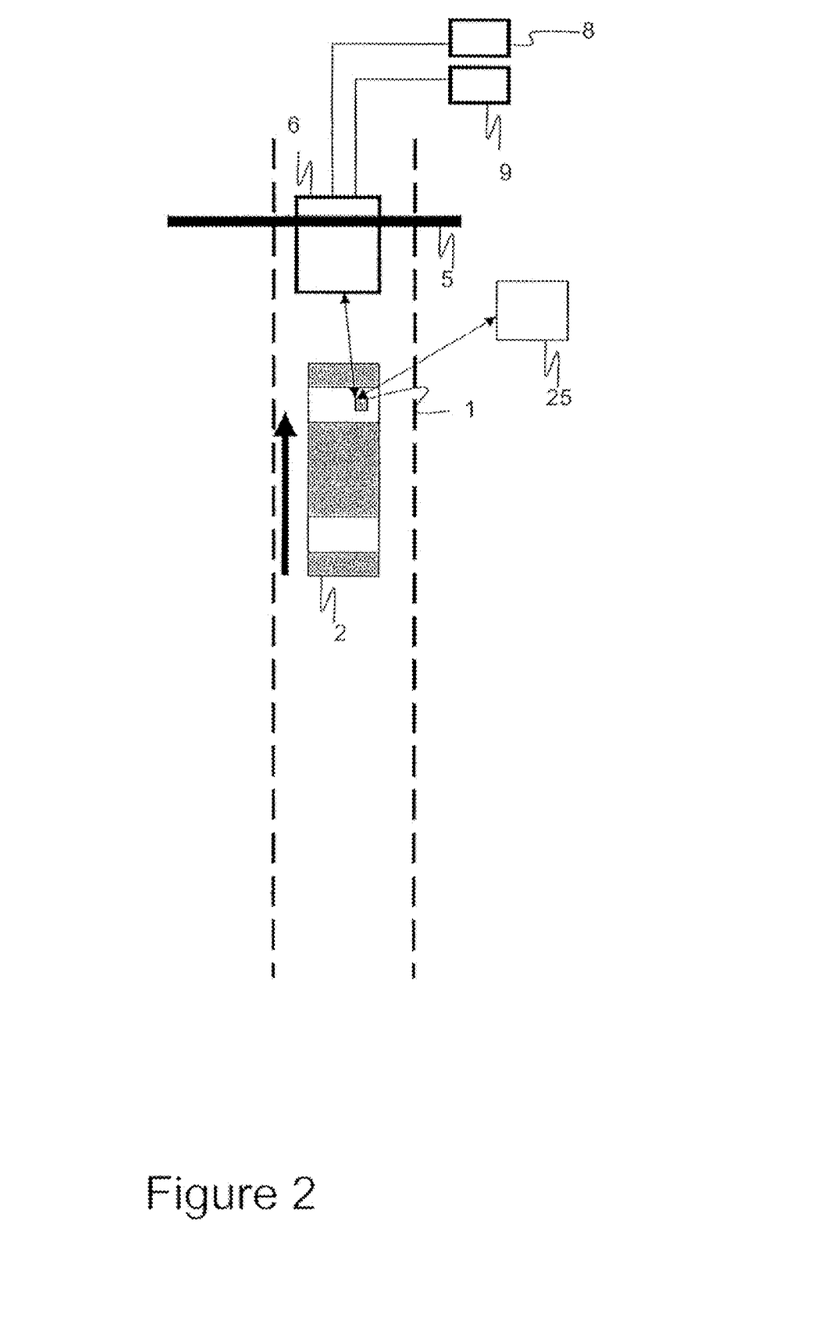
FIG. 2 is a diagram of a further exemplary system using a smart phone as a transponder.

In a further aspect of the system, shown in FIG. 2, multiple BLE transmitters, or beacons 9, can be installed across the roadway on a gantry 5 and connected to high gain antennas 6. WiFi transceivers 8 may also be connected to the antennas 6. A high gain antenna for purposes of this specification is an antenna with a gain of 8 db or higher.

In an embodiment, the beacon ID and time stamp are included in the beacon transmitted data to allow the smart phone to identify its location at a time stamp. The phone 1 then sends beacon ID and time stamp along with phone/vehicle identification to a remote toll server 25 via the phone's common carrier cellular data connection. The BLE beacon 9 transmits at a high rate, approximately once per 20 milliseconds. The beacon time stamp is synchronized to local system time to resolve transactions. Specialized beacons with high gain can be used for tracking or localization.

An exemplary beacon is the iBeacon®, which uses a protocol developed by Apple®. Various vendors have since made iBeacon®-compatible hardware transmitters that advertise their ID to nearby portable electronic devices. The technology enables smart phones, tablets and other devices to perform actions when in close proximity to an iBeacon®.

In an embodiment, the phone receives messages from multiple beacons and stores relevant data fields such as beacon ID, plaza and lane number, latitude/longitude, time and date, and RSSI.

As battery life on mobile devices is a key product differentiator, some devices limit the transmit rate or the effective receive rate for wireless transceivers. For example, iPhones® apply such limits to the BLE functionality, resulting in a maximum transmission rate that is less than the BLE standard maximum and a diminished sample rate when the device is scanning for beacons; that is, the sample rate is less than the BLE transmission standard maximum, so samples cannot keep up with beacons transmitting at that rate.

These restrictions are relaxed, however, when the phone is detecting an iBeacon®, so while it is in range of an iBeacon® it is able to record BLE beacon data in background/sleep mode at nearly the same rate as the beacon advertising rate. This requires a system architecture that contains iBeacons® to "awaken" iPhones® and beacons to provide advertisements for the toll transaction. The iBeacons® must have a coverage zone that extends well upstream from the toll plaza to provide sufficient time for the phones to be ready to record beacon data when travelling through the plaza. A single antenna or multiple low gain antennas may be used to provide a wide area communications zone to accomplish successful reception of the iBeacon message. These are used in combination with high gain antennas used for the subsequent beacon messages which form a more constrained communication zone. The phone may transmit log data to a server for post processing and analysis, or preferentially analyze it to determine lane number and transmit that information to a server.

The simplest approach, when the phone is acting as a receiver and beacon transmitters are fixed across a roadway, is for the fixed equipment to transmit BLE undirected non-connectable advertisements. The format of the advertisement message is defined in the BLE standard, and includes 31 bytes of user-defined data that can include all relevant information for a toll transaction. The phones operate as BLE passive scanners and do not transmit. An individual phone would likely hear multiple beacons as it traverses a toll plaza, and would have to process the data to determine lane location or transfer the data to a back office for post-processing, including lane location.

Non-connectable, undirected BLE advertisements have a minimum time interval between advertisements of 100 msec. This time represents 14.7 feet for a vehicle traveling at 100 mph. Shorter time intervals are necessary for accurate signal strength histories, and are also useful for timing coordination with existing sub-systems in a toll plaza such as video camera systems. Connectable, directed BLE advertisements have a minimum time interval between advertisements of 20 msec, or 2.9 feet for a vehicle traveling at 100 mph. This provides much improved resolution while eliciting BLE scan requests from mobiles.

Further time resolution may be achieved by including multiple BLE modules in a beacon. For instance, two beacons can share an RF connection to an antenna, making the effective advertisement interval equal to 10 msec. The mobile application would have to correctly interpret advertisements from both beacons as coming from the same lane, a simple matter of software. Finally, a high duty cycle mode exists in BLE connectable directed advertisements, where the maximum advertising interval is 3.75 msec. This would provide a significant increase in resolution, perhaps more than necessary for a toll system. However, not all devices support this high duty cycle mode.

The data recorded on the phone would likely include, at a minimum, time stamp, beacon ID, and RSSI for each sample. The sample plot in FIG. 8 displays BLE RSSI recorded on a phone located in a vehicle traveling through a lane with a Beacon overhead in the travel lane and another Beacon overhead in an adjacent lane. The difference in peak signal strength between two Beacons is clear, and one Beacon is clearly stronger for the majority of the record. This concept is not restricted to BLE, as the wireless protocol may be WiFi or any other that is available on a smart phone.

In an approach, multiple messages may be transmitted by a BLE transceiver, or "beacon", through a high gain antenna and received by the smart phone. The high gain antenna will be generally set up on an overhead gantry with maximum gain direction pointing towards the road surface or slightly up-tilted toward vehicles as they approach the toll point, forming a capture zone on the road where vehicles are in position to communicate with the beacons. While the capture zones for each beacon will overlap in a typical case of one antenna per standard-width lane, higher signal strengths tend to occur near the antenna boresight. Because the lane numbers are associated with beacons with known IDs, the location of the vehicle can be determined by analyzing RSSI data for the beacons captured on the phone. The phone application 17 may evaluate the number of messages received and the RSSI values from each beacon to determine the position of the phone relative to the beacons, hence the lane. The toll can then be collected from an account associated with the unique ID for the vehicle passing the toll point in that particular lane, wherein the lane/proximate antenna/beacon information is sent with the unique ID to the toll system and or account service center. One approach in this case is that the application on the phone compares the signal strengths received from each beacon antenna to determine the strongest one over a specified period, say 30 milliseconds. As the phone traverses the roadway, each period has a count assigned based on the strongest signal strength received on an antenna, the most proximate antenna or alternatively the lane of travel is determined to be the antenna or lane with the most counts in a larger second period (say 300 milliseconds) or the total such counts during a the entire period required to traverse the section of roadway.

Another simple algorithm to make the lane determination is to examine the strongest N samples for all beacons and average them to create a single number for each lane. This may be thought of as a low-order estimate of the area under the curves, proportional to energy, and possessing increasing accuracy as N increases. As N increases, more calculations are required which increase the burden on the processor. Hence a proper value for N is a tradeoff between accuracy and processor burden. In practice, the number N can be arrived at through trial and error. In the case summarized in FIG. 8, the difference in the averages between the correct lane and adjacent lane is 13 dB, using N=10. The difference of 13 dB is also approximately equal to the peaks of the curves. Utilizing a single peak value would provide the correct answer in many cases, but RF multipath can corrupt a single sample more easily than several samples.

Figure 8:
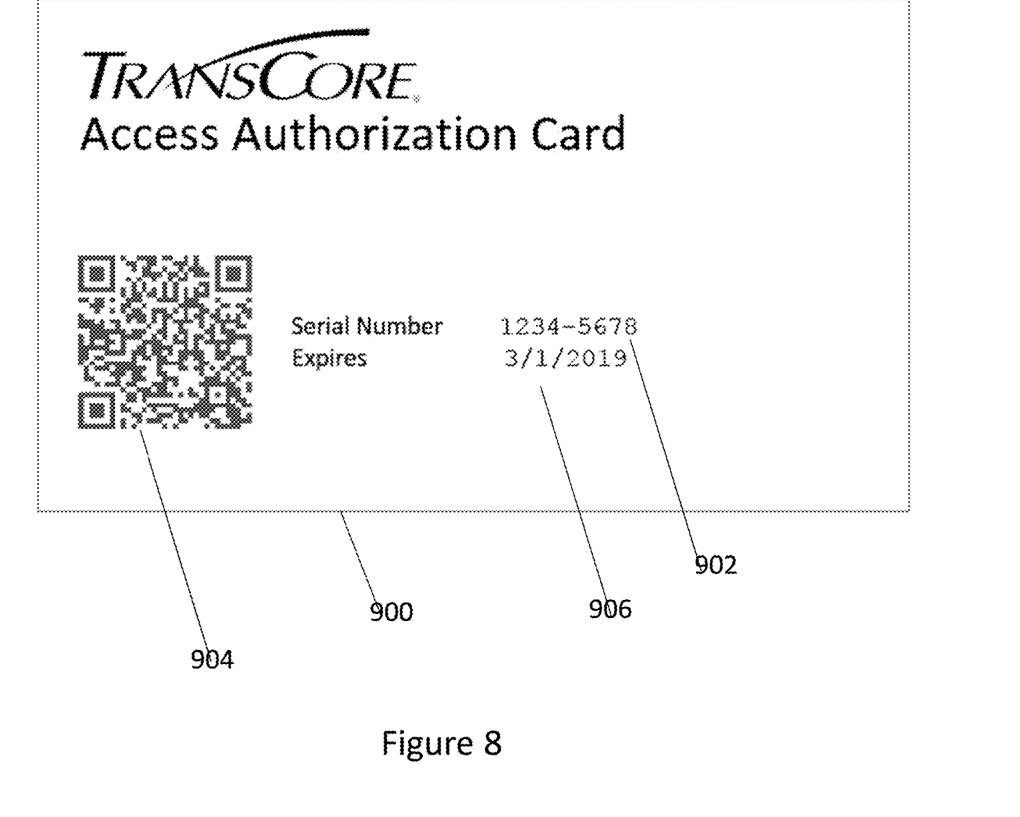
FIG. 8 is a front view of an access card for use with a system using a smart phone as a transponder.

To assign the best time stamp for correlating the vehicle passage to other lane sensors, a straightforward algorithm is to use the median of the time stamps for the five data points with highest RSSI in the assigned lane as can be performed for example on the plot in FIG. 8. This synchronized and accurate time stamp combined with accurate lane position allows the transaction to be accurately post-processed into the toll system transaction.

To use the system, users download an application with the foregoing capabilities to the smart phone. Upon download of the phone application, the user will use application-supported account management features to set up an account with the appropriate toll authority or third party service provider, create a link between the unique ID/address information to the account, and provide a means for the settlement of toll charges associated with the unique ID (such as a credit card).

Figure 6:
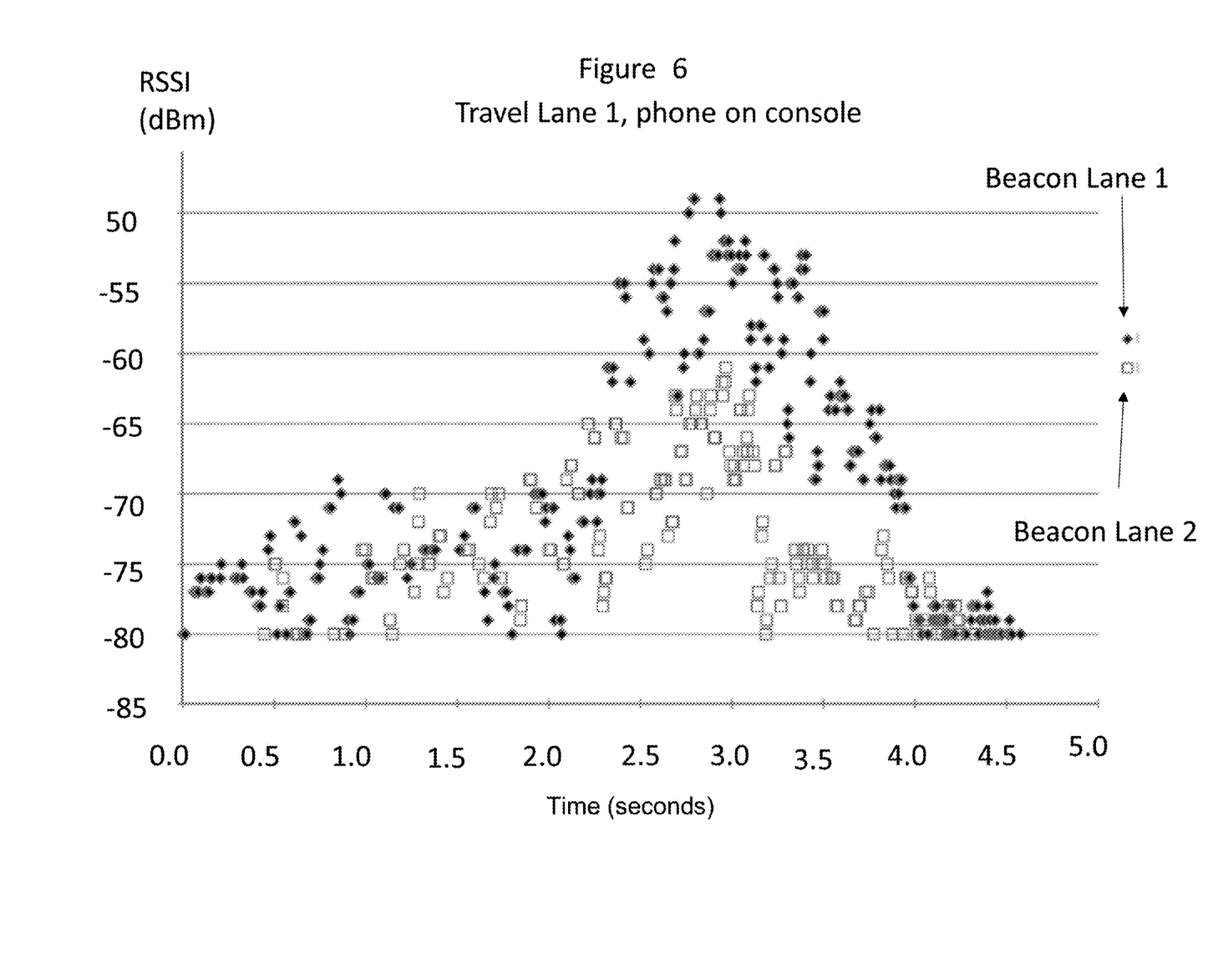
FIG. 6 is a graph of RSSI versus time for beacons in two locations.

In an aspect of the system, it is possible to determine which lane a vehicle and phone are in based on messages received from multiple BLE beacons. In an embodiment, upon receiving beacon messages and leaving a Geo-fence area or iBeacon® zone, the raw beacon log data is transferred from smart phone to server for transaction analysis/processing. See FIG. 6 for diagram of beacons within a Geo-fence.

Alternatively, the smart phone application can simply save the Bluetooth® LE beacon messages as the smart phone passes under the high gain beacons on the toll facility. The messages will contain, at a minimum, data identifying the location of the toll lane and the time the beacon message was sent. The smart phone will normally receive multiple messages from multiple beacons while traversing the toll plaza. A clock in the beacon establishes the time in the message and is synchronized to the other toll equipment to a sufficient resolution (say 1-100 ms) to allow the transaction to be correlated based on the time of the transaction with other elements of the toll system such as a vehicle detection system or a video-based license plate reading system. This saved data is then sent as soon as practical via any of the smart phone's data connections (Bluetooth®, WiFi, WAN data) to a server where the processing to determine the lane position described above is executed. In this case the server need not be located roadside but can be located anywhere.

In one embodiment a Geo-fence function is used to determine when the buffered BLE beacon messages or processed results should be sent to the server over an available data connection. Geo-fence applications are well known in the art and provide a function to allow a specific area to be defined such that an alert is generated when the Geo-zone area is entered or exited. A Geo-zone can be created around the toll plaza or area. When the area is exited an alert triggers the sending of the processed or unprocessed beacon data to the server for post processing into the toll transaction. Similarly a Geo-zone can be established downstream of the toll point where traffic must traverse, and entry into this Geo-zone can also trigger the sending of buffered data to the server for processing.

It may not be possible given the state of smart phone technology or limitations in smart phone systems to send beacon data in real time to the server. However, because the beacon data contains a time stamp synchronized to the toll system at the toll plaza, a toll transaction can be generated and post-processed with other data collected from other toll sensors proximate to the roadway to form a complete toll transaction. For example, most toll systems include a video-based enforcement/toll system at the toll plaza. Such systems use various techniques well known in the art to take a photo of the vehicle license plate which can later be processed and "read" automatically by a computer. In prior art systems, the toll payment is made by an RFID reader reading an RFID tag associated with a user account that settled to the users credit card or bank account. If this toll payment is made, the photo taken of the license plate is associated with the vehicle need not be processed and can be discarded or stored according to policy. If a payment is not made, either a violation against the vehicle owner of record or a video-based toll against an account or the vehicle owner of record is processed.

One advantage of post processing the transaction data is that substantially all of the data points collected on the transaction between the beacon and the smart phone can be collected and used to determine the lane position and to determine a time stamp for the transaction that best represents when the vehicle passed under the antenna. More data typically means better quality output result for almost any reasonable algorithm used to determine vehicle position relative to the beacon antennas.

Typically a trigger system is used, employing one of many vehicle detection technologies known in the art, to determine the vehicle's location on the roadway to take the photo of the license plate. In order to allow toll payment by smart phone rather than RFID tag, the phone application requires the user to establish an account with the toll authority, or through a private third party account consolidator who sets up a consolidated account for the user with multiple toll agencies. At that time an account identifier is established by the application or by an account server in communication with the application over an internet connection supported by the smart phone. That account identifier is sent by the smart phone when the processed or unprocessed beacon data is sent to the server, typically after a Geo-fence or iBeacon zone exit event occurs to trigger the sending of this data. The trigger point for the license plate photograph is aligned to the direction of maximum gain of the antenna, allowing the determined travel lane to be associated with an accurate time stamp. As this time stamp is also synchronized with the video system, the beacon transaction can be compared to the video transaction to ensure they are from the same vehicle, eliminating the need for the license plate photo to be processed.

Typically, this transaction from the smart phone will not occur in real time. This is because the sending of the data will be triggered by an event such as a GeoZone exit (or entry) event, iBeacon read zone exit, or RSSI residing below a threshold for an elapsed time, all of which occur after the vehicle has passed through the toll plaza. Additional sources of latency in the communications network will add to this. All of the data collected as the vehicle traverses the plaza is available for the algorithm that determines lane and time of passage. It also implies that the photo data and any other associated sensor data pertaining to the toll transaction must be stored for some period of time to allow receipt and processing of the data from the smart phone to create the toll transaction, so that it may be post processed against this stored data as described above. The minimum period of storage, and the resulting storage capacity are determined based on the maximum expected delay in sending and processing the smart phone data so that it may be post processed. Alternatively, all such data may be permanently stored according to policy.

In Apple's® iOS® operating system, applications that are not actively being used by the user operate in the background. Usually these applications cannot process data or access resources to preserve battery life. In the contemplated system it is highly advantageous to avoid the need for user action, as a matter of customer convenience and driving safety. There are some exceptions in iOS that will allow some processing time to be allocated to an application running in the background. One exception involves the use of geographical areas. Upon entering a geographical area, the phone application can be automatically launched or elevated in priority by the operating system. Upon receipt of BLE data expected by or intended for the phone application, iOS will provide a specific allotment of time for the application to process the BLE data. In one embodiment all of the stored BLE messages received are uploaded to the server over the WAN data link using a web services call.

Another approach to resource conservation, while the toll application sits in the background, is to create iBeacon® zones in the roadways that have beacon zones within them. An iPhone® will not log iBeacon® advertisements at a rate faster than one per second, regardless of the iBeacon® advertisement rate. It will record beacon advertisements much faster in general, and approximately at the same rate as the advertisement itself, if the iPhone® is in range of an iBeacon®.

In a further embodiment, transaction data is stored in a file on the phone. Data can be received and logged even with the phone in sleep mode. Data is downloaded to a server with no user intervention, triggered by an event such as a Geo-fence trigger described above. Because data will not be downloaded in real time, transactions must be post-processed into the toll transaction to be correlated with data taken at the toll area, such as video or camera recording of license plate, and vehicle detection.

In one alternative, a transponder device is installed in the conventional electronic toll lane in a similar fashion to how test transponders are used today. The transponder acts as a repeater of the information transmitted by the smart phone. The transponder contains a BLE or WiFi transceiver which receives transaction information from the phone to include the phone unique ID. When interrogated by a reader, the transponder will mimic the type of message sent in conventional electronic toll messages with an account ID associated with the phone unique ID. In this way the system described above can be implemented with minimal or no changes in the software and integration of the toll system or conventional back office/service center.

In another embodiment, BLE beacons broadcast advertisements via antennas 6 that are typically dispersed one per lane, although two per lane may be used, or fewer than one per lane may be used. When received in an application resident on the smart phone 17 these advertisements trigger response messages sent by either the BLE radio 9 or WiFi 8 radio in the smart phone with a data response similar to how prior art active RFID transponders behave today. Simultaneously, these BLE Beacon messages could trigger return messages to the toll system over any combination of WiFi, BLE or common carrier WAN data connection present on almost all smart phones. These responses contain information that is sent to a service center for the settling of toll collection related to the vehicles' use of the roadway. This information is transmitted to the service center either by a toll system network of the type commonly used today (in the case of WiFi or BLE return message) or via the WAN connection 10 directly from the smart phone to the service center, or any combination thereof which provides for redundancy of messaging and therefore enhanced reliability. In all cases the return message with unique identifier is received at the service center where account settlement is performed, and the toll is settled to the account associated with it. In a further embodiment, a smart phone is a receiver initially scanning passively for BLE advertisements from the beacons as it enters a capture zone. Upon decoding an advertisement, the phone optionally sends a BLE Scan Request to the beacon. The request payload consists of the beacon address and the phone MAC address. The beacon issues a BLE Scan Response in response to each received Scan Request. The total number of scan responses represents the number of transactions with a phone.

The timestamp for the transaction resides in the scan request payload and must match the timestamp for other toll systems (i.e. video cameras), within an allowable tolerance.

At the completion of the transaction, the system composes an encrypted data packet containing the phone MAC address, time and date, plaza and lane ID. This is sent to a back office via typical means, for example either over land line communications such as an internet connection or wirelessly such as by a cellular data connection, and checked against video data for violations.

In an implementation utilizing single-beam antennas, each lane will typically contain an overhead antenna 6 with high gain, circular polarization, and sufficient bandwidth to cover the entire ISM band around 2.45 GHz. The antenna points approximately downward, reducing potential for cross lane communication. By contrast, antenna pointing angles near horizontal can allow large vehicles to block the direct RF path of smaller vehicles in the same lane, and multiple phones in different lanes to be transacted with at relatively longer distances where the beams have spread significantly. Pointing downward, therefore, allows easier control of the capture zone.

A high gain antenna with low side lobes and a sharp beam roll off will minimize RF leakage into the adjacent lanes. This pattern must be consistent across the entire ISM band because BLE uses RF frequencies spanning the band.

Circular polarization is preferred in the beacon antenna because of the variable antenna pattern in the phone. Linear vertical or horizontal polarization could be used, but circular polarization is preferred so as to make the communication link to the phone less sensitive to the orientation of the phone in the vehicle. This allows the user more flexibility for the phone's location inside the vehicle, including the seat, in pocket, on the vehicle's dash board, or in its center console, creating good RF link performance unaffected by orientation of the phone. Most antennas targeting 2.45 GHz devices in mobile phones have nulls in each plane. The location and depth of the nulls is dependent on frequency and polarization, and a circularly polarized Beacon antenna will provide polarization diversity.

Frequency diversity is a de-facto feature of the system when using wireless protocols that utilize a sufficiently large RF frequency band. A large operating frequency band causes phone antenna nulls and RF fades to move as frequency changes. In a BLE system, for example, advertising channels hop between 2402, 2426, and 2480 MHz. The antenna operating band must be at least this large to take advantage of this.

The required antenna features of the system described above enhance chances of the in-lane beacon transacting with the phone, as opposed to the adjacent-lane beacon. It does not entirely rule out cross lane transactions, so an appropriate system will monitor the number of transactions on all beacons for a specific phone and choose the travel lane appropriately.

With smart phones acting as transmitters, the receiving antennas located in the toll plaza may take multiple forms. One embodiment is a pair of multi-beam antennas straddling the roadside to enable angle-of-arrival-based lane determination. A common form for the multi-beam antennas are planar arrays with Butler matrix feed systems. Butler matrix antenna configurations are known in the art but can be uniquely applied in this case with either the WiFi or the Bluetooth® LE radio signals to track vehicles in which the phones are present and associated. The multi-beam antennas can be used on their own for both communications and tracking, but may also be used with a set of low gain antennas where the low gain antennas cover the entire area of interest to allow more time for reliable communications and the multi-beam antennas are used for tracking only or primarily for tracking. The Butler matrix is a well-known beam-former, producing N beams from N groups of radiators.

Figure 5:
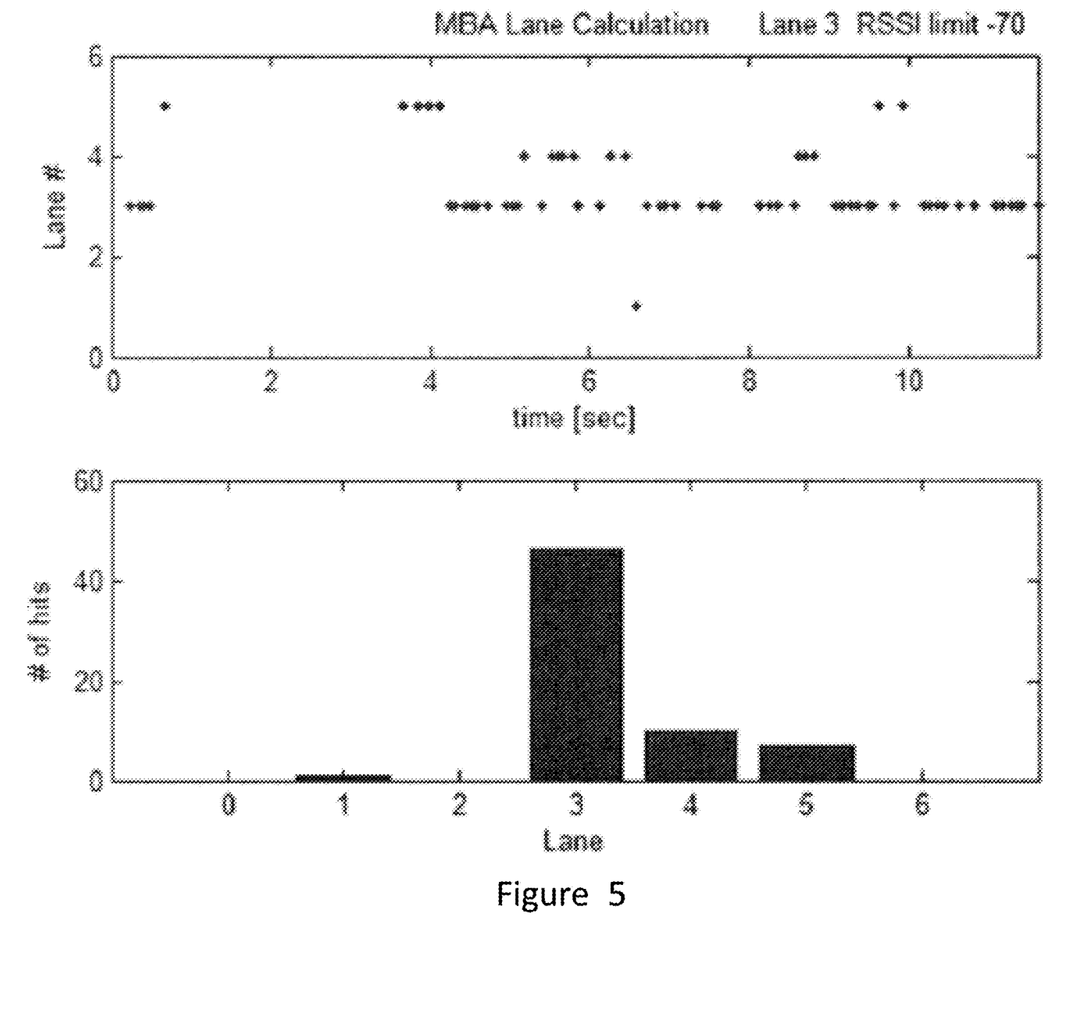
FIG. 5 is test results of a test-setup using two Butler Matrix antenna arrays.

FIG. 5 shows the results of experimental evaluation conducted with two multi-beam antennas installed roadside. The test results showed significant ability to locate the vehicle position across six available lanes of travel. The graph shows post-processed data: the computed lane number as a function of time, and the total number of hits for each lane. Multipath is evident in hits for lanes beside lane 3 (the actual travel lane). One car at a time was tested.

These experiments were conducted with a 2.45 GHz radio in the vehicle under the dash on the left side of the vehicle, which is a non-ideal position for the transmitter in the vehicle because the signal must reach the receiver via multi-path. Similar, but less severe multi-path can be expected based on the typical locations users will have their phone in the vehicle, be it in the user's pocket, belt, purse, cup holder or passenger seat. All of these locations will potentially see multi-path between the smart phone and exterior antennas, but probably less severe than the conditions of the experiment. Notwithstanding the more severe multi path conditions for the experiment, reasonably good position results were obtained in determining the lane of travel by assigning the transmitter to a lane position by summing the number of points where the peak beam signal strength of the Butler matrix antennas indicated an intersection point in a particular lane and assigning the lane position to the lane with the greatest number of such points as the vehicle traverses a section of roadway.

To use the system, users download an application to the smart phone. Upon download of the phone application, the user will use application supported account management features to set up an account with the appropriate toll authority or third party service provider, create a link between the unique ID/address information to the account, provide a means for the settlement of toll charges associated with the unique ID (such as a credit card).

The test results FIG. 5 show significant ability to locate the vehicle position across six lanes. The graph shows post-processed data: the computed lane number as a function of time, and the total number of hits for each lane. Multipath is evident in hits for lanes beside lane 3 (the actual travel lane). One car at a time was tested.

In another embodiment, the smart phone application is configured to support the accurate and secure self-reporting of miles driven by taxpayers in jurisdictions where taxes are collected based on the number of miles driven in the jurisdiction. As a possible way to meet policy objectives, California and Oregon have pilot projects and consideration is being given to similar taxation system by the U.S. Federal Government. However a practical, private, easy, accurate and secure way for user to report the mileage and corresponding tax has been lacking.

The basic reporting approach involves installing BLE beacons at locations convenient to the motorist such as gas stations, oil change facilities, smog check stations and car washes, called reporting facilities. In the preferred embodiment drivers self-report the mileage and pay the tax periodically, perhaps once per quarter or per year. The phone application of the invention makes it easy and secure to report mileage.

The design of the phone application is such that the user enters a reporting facility and parks in a designated location designed to be covered by the BLE beacon. The beacon data includes location data and a secure identifier. In one embodiment the secure identifier is an encrypted combination of the time and location information. The locations are selected and high gain antennas placed such that no more than one vehicle can be parked in a designated location simultaneously.

The phone application recognizes the beacon, processes the data, and starts the procedure. The user is prompted to take a photo of the vehicle odometer reading, and the application records the fact that the photo was taken proximate to the secure beacon and a specific date and time. Next the user is prompted to take a picture of the VIN or license plate number, and the application records that the VIN is also proximate to the same secure beacon at the same date/time (within a tolerance). This ensures that in fact the odometer photo and the VIN or license plate number photo are from the same vehicle.

The phone application applies OCR techniques to the odometer reading to create a data element and compares this reading to the previous reading. The application calculates the tax based on the difference in mileage from the previous reading.

Once the tax owed is calculated the phone application then prompts the user to make payment by electronic check, ACH, or credit card, Pay Pal® or other known payment systems. These payment methods can be newly established at the time of payment or stored at the user's preference. The user makes payment and an official receipt is sent to the users stored e-mail address.

If a user wishes to account for miles driven on non-taxable roads that might be exempt from the tax, such as out of state or private roads, a BLE beacon can similarly be placed at the access point to those facilities. For example, BLE beacons can be installed at the state borders to account for out of state miles. The phone application detects these border beacons to validate that the vehicle has indeed crossed the state line. Alternatively two beacons in sequence could be used to validate the direction of travel at the state line. The secure border beacon location data is stored in the application. The phone application then sets up a large position change feature on the phone, so that the phone application is activated by the phone upon a significant change in position, or after a certain period of time has elapsed. Upon activation, the application evaluates the data from at least one GPS fix to determine the estimated miles driven from the border beacon location. Upon each subsequent activation of the application on the phone a new GPS fix is taken and an incremental number of miles driven out of state. This process continues until the phone crosses another border beacon system indicating re-entry into the state (or alternatively, a GPS position fix within the state). The total accumulated miles out of driven out of state can be determined.

In addition, if policy dictates the need to collect mileage based tax or fee at different rates on different types of roadways this can be accommodated by the system design. For example, if a different rate is to be charged for controlled access highways than arterials, beacons can be placed on the controlled access points to identify entry and exit points which allow the determination of total miles driven on controlled access highways. Those miles can be accumulated in a separate buffer such that at the time of tax payment calculation the tax due can be determined based upon the differentiated miles driven. Similarly, when miles are driven on a toll facility which might typically be exempt from a mileage charge, BLE beacons on the toll facility can be segregated to calculate the correct adjustment to the tax owed at time of payment. Of course as described in this disclosure the BLE beacons can work with the phone application to be the primary method of toll collection, providing a seamless approach for the user to pay for services rendered.

Consistent with embodiments described herein, the following describes a method to securely and conveniently enroll user smart phones or similar devices that may be used in systems as described herein in an access control system to provide access to a limited-access facility via a smart phone running a dedicated access application. Manually entering a long alpha numeric identification key into an access control system for use with a smart phone or other wireless-enabled personal device, including smart watches and tablet computers as an access transponder is both tedious and can be prone to operator error and fraud. Also, a mechanism is needed that can allow access by the user's personal device to be easily revoked by the gate's manager and by users who lose or replace devices. As described herein, utilizing access cards having unique user identification and serial numbers that may be scanned into a smart phone, allows easy enrollment/disenrollment and authorized user management of smartphones used as keys in an electronic gated entry or access control system.

Figure 7:
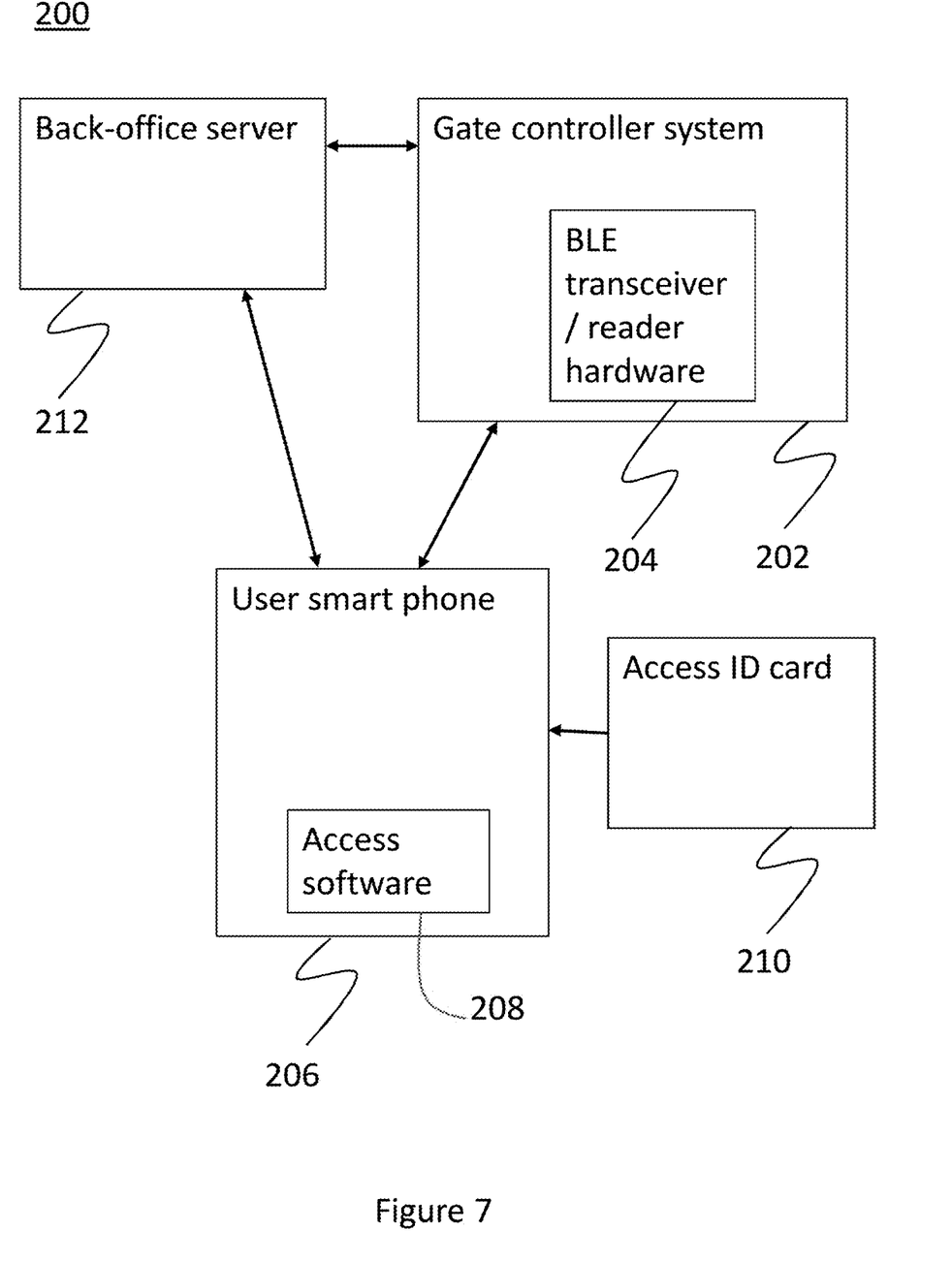
FIG. 7 is an exemplary gate access system using a smart phone as a transponder.

FIG. 7 is a block diagram of an exemplary access control subscription system 200 consistent with embodiments described herein. System 200 may be used in conjunction with automatic gate opener systems equipped with BLE or WiFi transceivers to allow authentication with use of a smart cellular phone. System 200, as shown in FIG. 7, consists of an electronic gate controller system 202 having a BLE transceiver 204, a user smart phone 206 having smartphone-based facility access application software 208, a smart phone readable identification/authorization card 210 with identification card data, and a server 212 associated with a system operator and configured to authenticate the authorization card data, as described below.

An exemplary use of this system is with an electronically controlled gate system installed at facilities such as a gated community or corporate parking garage. The term gate includes any vehicle access barrier such as, but not limited to, retractable treadles, a pivoting bar, a bar having a first portion that pivots and a second portion that remains substantially parallel with the roadway surface; retractable bollards, a retractable door, a hinged or linearly retractable fence gate and the like. Users who wish to use their smart phone or similar device such as a smart watch to activate the gate opener would first install the software application 208 on their compatible smart phone. The operator of the gated facility provides a new user an access authorization card 210 one example of which is shown in FIG. 8. The new user scans the access authorization card with the mobile application 208 installed on their smartphone 206 to retrieve or otherwise obtain the authorization card data embedded therein. In response, smart phone 206 communicates the authorization card data to server 212. If server 212 determines that the access authorization card is valid, access to the gate will be granted each time the phone is presented at the gate. The user will be able to access the gate until the authorization expires, or they are blacklisted by the gate administrator.

The access authorization cards (example shown in FIG. 8) may contain a QR code or similar graphic data representation to automate the process of entering the card's data into a phone. The access authorization card 900 may include a card serial number 902, transponder ID number, expiration date 906 and other information such as instructions and a URL to the service provider's webpage. A transponder ID number may be encoded within a QR code 904 on the access authorization card and not be printed in a human readable format on the access authorization card 900. These ID numbers may be issued and printed on cards (in graphic form such as QR codes) in a randomized, non-sequential order to prevent malicious users from predicting other ID numbers for unauthorized access. The serial number 902 may be written in plain text (human readable). The transponder ID number will be a large number (e.g. 16 digits) and non-sequential to prevent unauthorized cards from being produced. A malicious user could not simply guess the next authorization card available. In an aspect of the system, during manufacture, a removeable (e.g., perforated) stub may be initially attached to the access authorization cards that contains identical information. When the authorization card is assigned to a user, the stub may be removed and retained by the facility manager to keep a record of which card was given to which user. As an additional security feature, the transponder ID's may be encrypted on the access cards.

Serial numbers 902 can be sequential and used to track production and sales of access cards, as well as used to link cards (e.g., in sever 212) to specific electronically-controlled access gates. When an order is placed for access authorization cards by a facility, the purchaser will also indicate the gate ID number associated with their gate hardware. Before sending a shipment of new cards, the service provider will first link those new cards, by serial number, to that gate ID, so that the operator will only allow those cards to open that specific gate.

Figure 9:
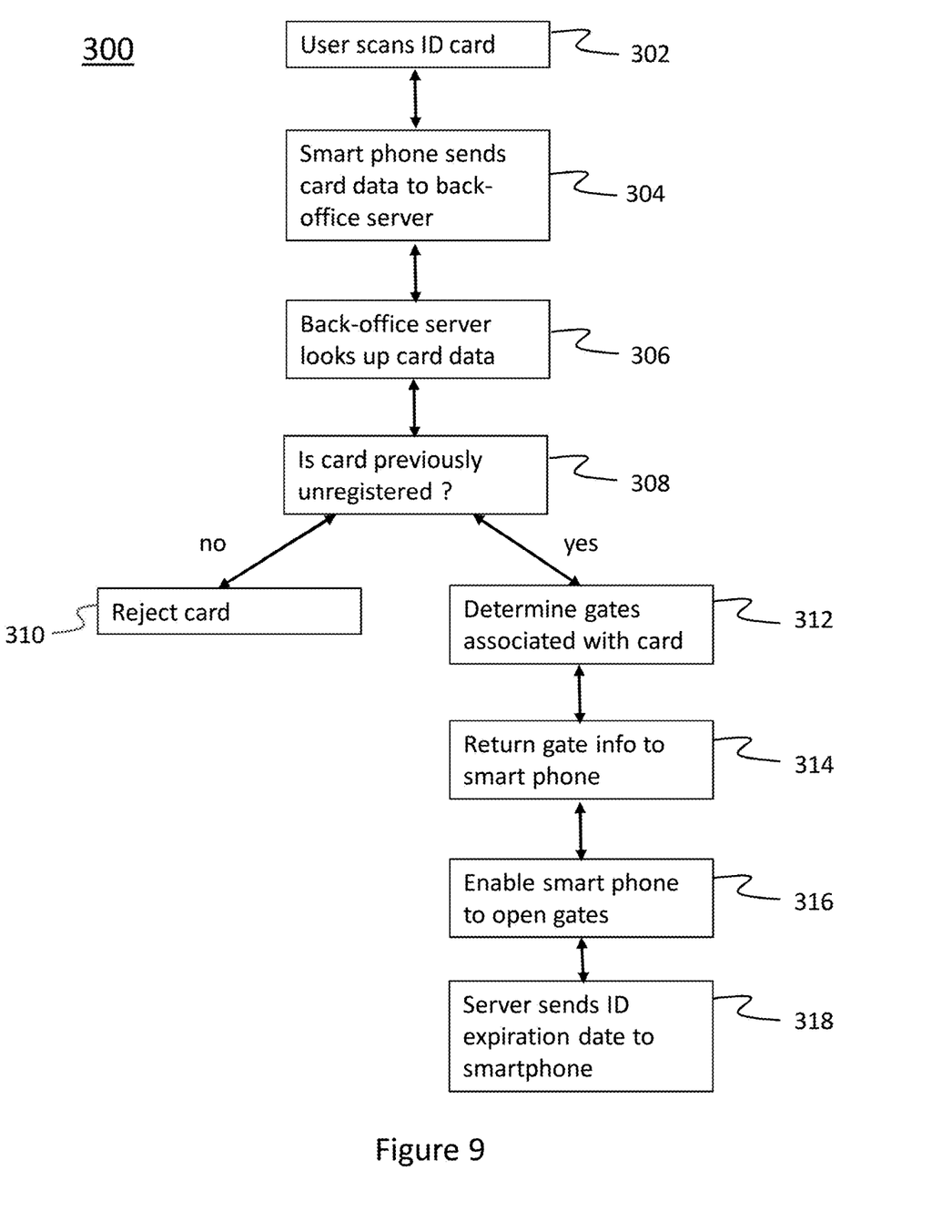
FIG. 9 is an exemplary process for registering a smart phone for gate access using a unique identification card.

Server 212 may be used as an authentication server for the access authorization card 210. FIG. 9 is a flow diagram illustrating an exemplary process 300 for activating a user authorization card 210. As shown in FIG. 11, process 300 beings when an authorization card 210 is initially scanned with end user's smart phone 206 (block 302). For example, a user may activate smart phone application 208 and capture the QR code 904 provided on card 210. Data from the card QR code 904 is sent to server 212 by smart phone 206 (block 304). This transmission may be over a cellular data network or an internet connection. Upon receipt of the QR code data, server 212 identifies the card's serial number and ID number in a database to see if these numbers have previously been used (block 306). At block 308, server 212 determines, whether card 210 has been previously unregistered (i.e., unused). If it is determined that the card 210 has been previously registered (block 308—no), server 212 will reject card 210 (block 310) and deny access to the gate.

However, if it is determined that card 210 has not been previously registered (block 308—yes), and is not past its expiration date (not shown), server 212 may determine the gate ID (or ID's of multiple gates, if applicable) associated with card 210 (block 312), and return that information to the user's smart phone (block 314) as well as enable that smart phone to operate the gate that was linked to the card scanned (block 316). The final piece of information that the server may send to the user phone is when the access to that facility will timeout (block 318). As an example, access may timeout one year after the validation of the card or on a fixed date, such as the end of a calendar year or school term year.

Access authorization cards 210 may be distributed by the gate's operator to all drivers who are allowed access to the gate, using their smart phone. When a gate administrator receives a batch of cards, they will receive a list of the transponder ID numbers associated with each serial number of the cards in the batch. These transponder ID numbers are used as the ID numbers programmed into the gate hardware white-list by the gate's administrator.

Once a phone is activated with a valid access authorization card as described above and in FIG. 9, the end user keeps the gate access application running in the background of their phone or similar device. When they approach the gate, the gate reader hardware 204 and the phone 206 will communicate via BLE or WiFi, as applicable, and the gate controller system 202 will receive from the transponder ID number from phone 206. Since gate controllers 202 may be using any number of preexisting legacy tag protocols to process dedicated legacy transponders (Wiegand, eGo®, etc.), reader hardware 204 installed at the gate may translate the user's transponder ID into a format readable by gate controller 202 used at that specific facility. The translated transponder ID number may be read by gate controller 202 as it would read a legacy tag, and if the transponder ID number is white-listed, the gate will open for the user. See the above description for a further embodiment of converting a smart phone transmitted ID to a legacy transponder signal.

The cards provide for ease of enrollment for new users. With this system, the gate administrator only needs to issue an access authorization card to a new user. Upon receipt of a batch of access authorization cards, the gate administrator could whitelist all access cards immediately, thus removing the step for an administrator to enter in new users to the system each time a card is given out. The only time the gate administrator needs to intervene after that is to revoke access for a user, or allow that card to expire without renewing the ID or issuing a new card. If a gate administrator wants to remove a person's access, they will simply remove their transponder ID from the gate controller's whitelist as done with the other forms of access available at that gate.

Another aspect of the card embodiment of the smart phone as transponder system is that it turns the concept of permission-to-enter into a physical, tangible item that can be physically transferred to someone. For example, in an apartment complex with a gated parking lot, an authorization access card can be issued to a new tenant along with the keys as part of the lease signing. For the new tenant, the card is a physical item showing they have been given access to the facility, while for the apartment complex, the batch of undistributed cards are part of their inventory that can be easily managed, tracked and safeguarded just as organization manages their inventories of remote controls, parking permit stickers and hangtags.

Another aspect of the access authorization card embodiment of the smart phone as transponder system is that the cards can move the up-front costs associated with the system from end user to facility manager. End users might be unwilling to purchase a paid phone application or submit their credit card information to download a paid phone application, thus the phone application would be distributed free of charge to end users, while the access authorization cards would be sold to facility managers. At that point it would be up to the facility managers to distribute the cards as they wish, either for free, or for a fee (with or without markup), just as is done with remote controls, RFID tags, parking permit stickers and hangtags.

Another aspect of the access authorization cards is that they are non-transferrable. In some communities, a pin number is assigned to be entered into a keypad for access. These PIN numbers are easily forgotten, or leaked to unauthorized persons. The phone as transponder system with a unique ID card provides the same security gained by remote controls or RFID tags, however, there is no physical item that needs to be returned to a facility manager if the user is moving or no longer needs access. Nor is there an additional piece of hardware for the end user to lose. The access authorization cards are one time use only, and can be discarded after they are scanned by a phone. Remote controls have batteries that need replacement, and the units themselves can wear out and break. Traditional keys can break, be lost or stolen and unauthorized copies can be made. Many facilities that give out access devices (e.g. keys, RFID key fobs, proximity cards, remote controls) require the user to put down a cash deposit, or be financially responsible for the items in case of damage or loss. This system eliminates the need for a deposit, or anything to be returned, yet provides the same level of security.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

The invention claimed is:

1. A control system comprising:
a server;
an application executing on a user device;
a card comprising identification data; and
an access control signal receiver,
wherein said application is configured to read said identification data on said card and to transmit said identification data to said server,
wherein said server is configured to associate said user device with said access control signal receiver based on said identification data, and
wherein said application is further configured to periodically transmit an identification signal and said access control signal receiver is configured to receive said identification signal and to enable vehicle access for a vehicle to a limited access facility based on said signal.

2. The control system of claim 1, wherein said signal receiver is a Wi-Fi® receiver and wherein said periodic identification signal is a Wi-Fi® signal.

3. The control system of claim 1, wherein said signal receiver is a Bluetooth® Low Energy (BLE) receiver and wherein said periodic identification signal is a BLE signal.

4. The control system of claim 1, wherein said application is further configured to transmit said identification data to said server via a cellular network.

5. The control system of claim 1, said application is further configured to transmit said identification data to said server via the internet.

6. The control system of claim 1, wherein said card comprises an encrypted identification number, and an unencrypted serial number.

7. The control system of claim 6, wherein said encrypted identification number is one of a set of non-sequential identification numbers assigned to cards and wherein said unencrypted serial number is one of a set of sequential numbers assigned to cards.

8. The control system of claim 6, wherein said encrypted identification number and said unencrypted serial number are represented in a graphic information medium.

9. The control system of claim 8, wherein said graphic information medium is either a bar code or a QR code.

10. The control system of claim 1, wherein said user device is a smart phone or a smart watch.

11. The control system of claim 10, wherein said signal receiver is a WiFi® receiver and wherein said periodic identification signal is a WiFi® signal.

12. The control system of claim 10, wherein said signal receiver is a Bluetooth® Low Energy (BLE) receiver and wherein said periodic identification signal is a BLE signal.

13. The control system of claim 10, wherein said application is further configured to transmit said identification data to said server via a cellular network.

14. The control system of claim 10, said application is further configured to transmit said identification data to said server via the internet.

15. The control system of claim 10, wherein said card comprises an encrypted identification number, and an unencrypted serial number.

16. The control system of claim 15, wherein said encrypted identification number is one of a set of non-sequential identification numbers assigned to cards and wherein said unencrypted serial number is one of a set of sequential numbers assigned to cards.

17. The control system of claim 15, wherein said encrypted identification number and said unencrypted serial number are represented in a graphic information medium.

18. The control system of claim 17, wherein said graphic information medium is either a bar code or a QR code.

* * * * *